July 1, 1930.  J. S. OECHSLE  1,769,159
ATTACHMENT FRAME FOR MOBILE UNITS
Filed Jan. 31, 1929  3 Sheets-Sheet 1

Inventor
JOSEPH S. OECHSLE
By Leo Edelson
Attorney.

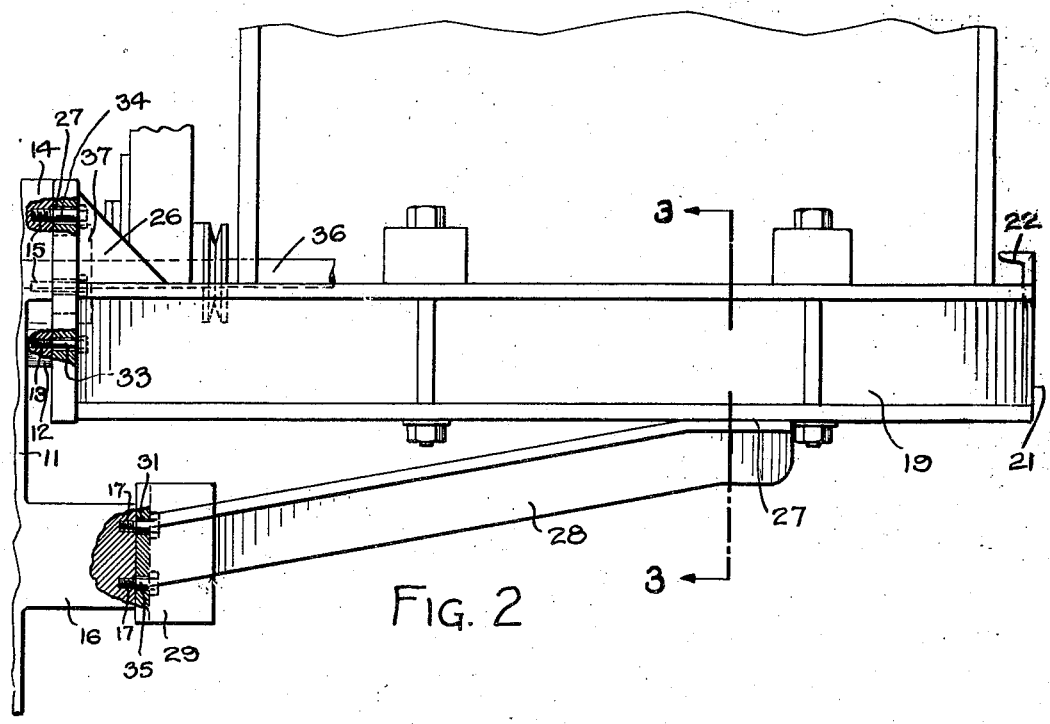
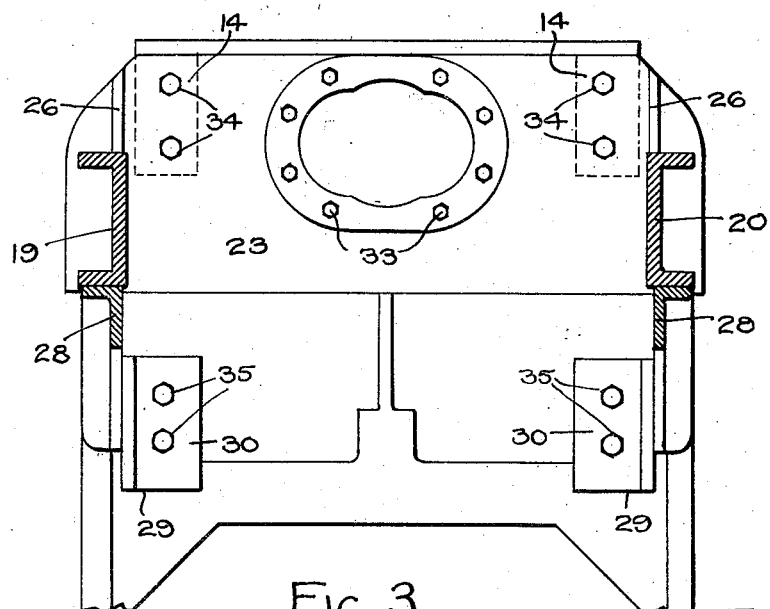

July 1, 1930. J. S. OECHSLE 1,769,159
ATTACHMENT FRAME FOR MOBILE UNITS
Filed Jan. 31, 1929 3 Sheets-Sheet 3

Inventor
JOSEPH S. OECHSLE
By Leon Edelson
Attorney

Patented July 1, 1930

1,769,159

UNITED STATES PATENT OFFICE

JOSEPH S. OECHSLE, OF PHILADELPHIA, PENNSYLVANIA, ASSIGNOR TO METALWELD, INCORPORATED, OF PHILADELPHIA, PENNSYLVANIA, A CORPORATION OF PENNSYLVANIA

ATTACHMENT FRAME FOR MOBILE UNITS

Application filed January 31, 1929. Serial No. 336,350.

This invention relates generally to mobile tractor units and more particularly to a unitary frame assembly which is attachable to the unit for supporting a work utility in operative position thereupon.

Mobile tractor units, being capable of propulsion under their own power from place to place, usually embody a source of propulsive power and in addition a suitable work utility, such as an air compressor for operating pneumatic tools, said utility being operated by the source of propulsive power when the latter is disconnected or not engaged in the transportation of the tractor unit as a whole.

An object of this invention is to provide an attachment frame for rigid connection to a mobile unit, such as a self-propelled tractor, the frame being so designed as to ensure a nonvibratory support for a work utility, the latter being adapted for operation by the tractor engine when not engaged in propulsion of the tractor from place to place.

A further object of the invention is the provision of an attachment frame assembly which may be readily applied to certain standard types of tractors with a minimum of effort and without necessitating any structural changes in the tractor itself, the said frame assembly being characterized by its great strength and rigidity and its ease of attachment to or detachment from the basal framework of the tractor.

A still further object of the invention is the provision of an attachment frame adapted to be detachably secured to a tractor unit in rearwardly extending relation therewith for supporting a work utility in operative position, the said supporting frame being designed and secured to the rear of the tractor in such manner as to permit the tractor drive shaft to be extended rearwardly beyond the rear axle housing of the tractor into driving engagement with the work utility supported by the attachment frame.

Still another object of the invention is the provision of an attachment frame or adapter which is capable of quickly and economically converting a standard tractor into a mobile unit having one or more work utilities adapted for operation thereby.

Other objects of the invention will appear more fully hereinafter.

The invention consists substantially in the combination, construction, location and relative arrangement of parts, all as will be described more fully hereinafter, as shown in the accompanying drawings, and as finally pointed out in the appended claims. In the accompanying drawings, which illustrate a preferred embodiment of the invention:

Figure 2 is a side elevational view of the attachment frame secured in rearwardly extending relation to the tractor unit, the latter being only partially shown;

Figure 3 is a transverse sectional view taken on the line 3—3 of Figure 2; and

Figure 1:
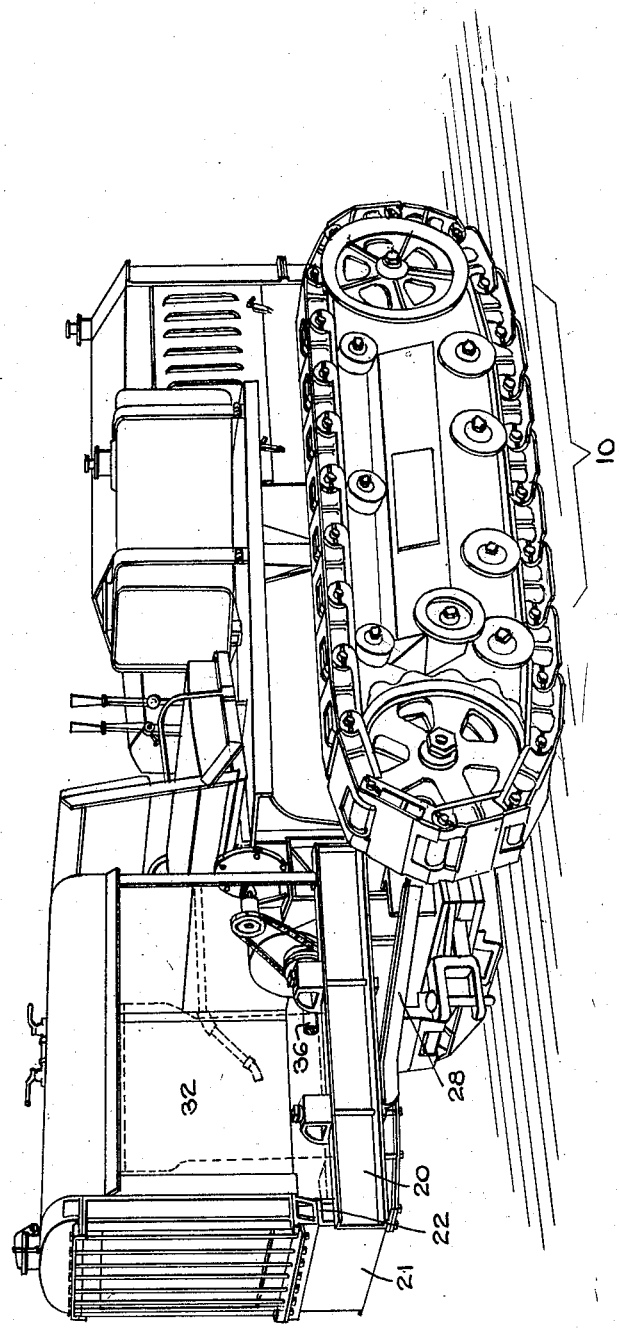
Figure 1 is a perspective view showing a standard form of tractor unit equipped with an attachment frame constructed in accordance with this invention.
Figure 4:
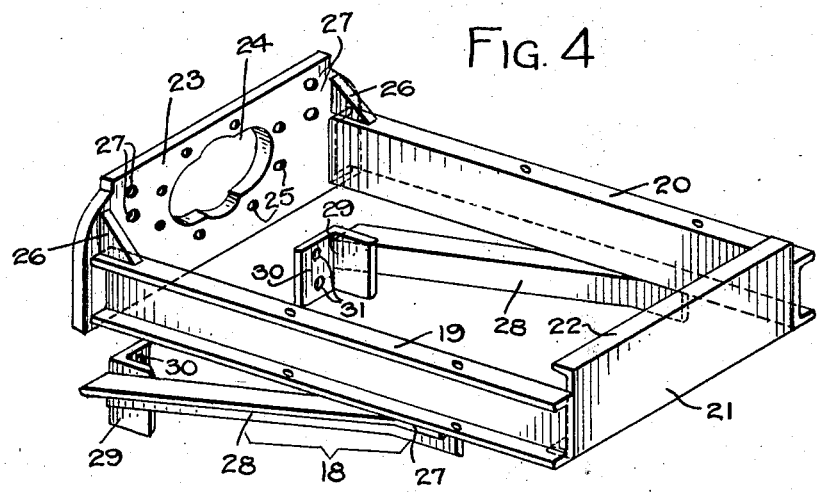
Figure 4 is a perspective view of the attachment frame assembly in detached relation to the tractor unit.

For the sake of practical explanation as to one convenient application of the present invention it has been elected—for purposes of example only—to describe the same as adapted to a mobile compressor unit, it being distinctly understood that the invention is in no sense to be limited to such use of the attachment frame as a support for a compressor unit as distinguished from any other form of work utility.

Referring now to the drawings it will be seen that the attachment frame constructed in accordance with the present invention has been applied to the rear of a standard type of tractor unit designated generally by the reference numeral 10. Except for the fact that this particular type of tractor unit embodies a substantially flat transversely extending plate 11 constituting the rear wall of the differential or rear axle housing of the tractor, the present invention is not concerned with the remaining constructional details of the tractor and accordingly the latter will not be described herein.

As appears most clearly in Figures 2 and 3 of the drawings, the plate 11 lies in a substantially vertically extending plane and is provided in the upper portion thereof with a flange 12 defining a central opening through which access is normally had to the interior of the differential housing, the central axis of this opening being in longitudinal alinement with the main drive shaft of the tractor unit. Ordinarily this flange 12 is covered by a closure plate (not shown) secured in place by means of a plurality of studs which pass through suitable openings in the closure plate and into threaded engagement with a corresponding number of suitably tapped holes 13 spaced circumferentially about the marginal edge of the flanged opening.

Integrally formed on the plate 11 and to either side of the flanged opening thereof are a pair of rearwardly projecting bosses or pads 14, the rear surfaces of which are substantially flat and lie in a plane paralleling that of the plate 11. Each of these bosses or pads 14 is provided with a pair of vertically spaced tapped holes 15. Integrally formed on the lower and depending portion of the plate 11 are a second pair of laterally spaced rearwardly projecting bosses or pads 16, each of the latter being arranged in vertically spaced relation with respect to one of the upper bosses or pads 14. It will be observed that the lower bosses 16 project rearwardly to greater extent than do the upper bosses 14. As in the case of the upper pair of bosses each of the lower bosses 16 is provided with a pair of vertically spaced tapped holes 17.

The attachment frame constructed in accordance with the present invention is comprehensively designated by the reference numeral 18 and comprises a pair of longitudinally extending side members 19 and 20, the rear ends of which are rigidly connected together by a transversely extending member 21. Preferably, but not necessarily, the side members 19 and 20 are each of channel cross section and are arranged with the channels presenting outwardly and away from each other. The transverse member 21 is also preferably of channel cross-section and is conveniently cut at its opposite ends to seat snugly between the webs of the side members 19 and 20, the upper flange 22 of the transverse member being preferably disposed at a somewhat higher elevation than are the upper flanges of the side members. The opposite ends of the transverse member 21 are suitably welded to the side members 19 and 20. As appears most clearly in Figure 1, the raised flange 22 constitutes the foundation for the radiator of the compressor unit.

Interconnecting the fore ends of the side members 19 and 20 is a vertically disposed transversely extending plate 23, the said fore ends of the side members being butt-welded to the flat surface of the plate 23 in order to afford a rigid and secure connection therebetween. This plate 23 is coextensive in width with that of the tractor rear plate 11 and is provided with an opening 24 arranged for registry with the opening in said tractor plate. Surrounding the opening 24 are a plurality of apertures 25 respectively adapted for registry with the tapped holes 13 of the tractor plate 11. In order to effect a still more rigid union between the plate 23 and the side members 19 and 20 of the attachment frame, it is preferable to weld a triangularly shaped gusset plate 26 in each of the angles formed between the flat surface of the plate 23 and the upper edges of the side members 19 and 20. In addition to the apertures 25, the plate 23 is provided with a pair of vertically spaced apertures 27 in each of the upper corners thereof for registry with the tapped holes 15 provided in the upper bosses 14.

Welded or otherwise secured to the bottom flanges of the side members 19 and 20, as at 27, are a pair of forwardly and downwardly inclined members 28, the latter being preferably of angle cross section. Secured to the free ends of these obliquely disposed members 28 are angle pieces 29 having transversely extending flanges 30 adapted to overlie and abut the rear surfaces of the lowermost bosses or pads 16. It will be understood, of course, that instead of providing a separate angle piece 29 welded to the free end of the inclined member 28, the same effect may be had by providing the lower end of member 28 with an integral laterally extending flange which overlies and is adapted for securement to its corresponding boss 16. Each of the transversely extending flanges 30 is provided with a pair of vertically spaced apertures 31 for registry with the tapped holes 17 of the lower bosses 16 of the tractor plate 11.

It will be observed that the side members 19 and 20, the rear member 21, the forward plate 23 and the obliquely disposed members 28—28 are rigidly secured together by welding or otherwise to provide a substantially integral and unitary frame assembly which is adapted to be mounted upon the tractor unit 10 in rearwardly extending relation therewith in such manner as to provide a solid and secure foundation for a work utility, such as the compressor unit 32 (see Fig. 1). To mount this unitary frame assembly upon the tractor it is merely necessary to so position the former that the opening 24 in the forward plate 23 thereof is in registry with the opening in the differential housing plate 11 of the tractor, the said plates 23 and 11 being secured together by suitable studs 33 which pass through the apertures 25 of the former into threaded engagement with the tapped holes 13 of the latter. In addition, studs 34 are employed to secure the upper corners of the plate 23 to the upper bosses 14 of the tractor unit, while studs 35 are employed to secure the lower free ends of the inclined members 28—28 to the lower bosses 16 of the tractor unit. In this manner, the attachment frame is rigidly secured as a unitary assembly upon the tractor unit.

Directly coupled to and extending through the central openings in plates 11 and 23 in rearward longitudinal alinement with respect to the transmission shaft of the tractor unit is a shaft 36 for driving the compressor unit, said shaft being suitably journalled in a stuffing box 37 carried jointly by said plates 11 and 23. Any suitable clutching means may be employed for connecting or disconnecting the compressor unit or other work utility from operation by the tractor engine.

From the foregoing description, it will be seen that this invention provides an attachment frame for the purpose specified which may be readily mounted upon or demounted from a standard type of tractor unit. The arrangement of this attachment frame in the form of a unitary assembly renders it readily adaptable for shipment in compact form at the same time that it imparts maximum strength and rigidity thereto. It will be understood, of course, that various changes may be made from time to time in constructional details of the invention without departing from the general spirit or principles thereof and it is accordingly intended to claim the same broadly as well as specifically as indicated by the appended claims.

What is claimed as new and useful is:

1. In combination, a tractor unit including a frame provided at its rear end with a transverse plate, said plate being provided with an opening therein in axial alinement with the transmission shaft of the unit, and a unitary frame assembly arranged to be mounted upon said tractor unit in rearwardly extending relation therewith, said assembly including a pair of spaced longitudinals, a transversely extending plate interconnecting the fore ends of said longitudinals, said latter plate being provided with an opening corresponding to said aforementioned opening, and means for securing said plates together with the openings thereof in registry with each other.

2. In combination, a tractor unit provided with a rear axle housing having a transversely extending vertically disposed rear wall, a unitary frame assembly arranged to be mounted in rearwardly extending relation to said tractor unit, said assembly including a pair of longitudinals, a transverse member interconnecting the rear ends thereof and a substantially vertically disposed plate member interconnecting the fore ends thereof, and means for securing said vertically disposed plate member to and in substantially parallel relation with said rear wall of the axle housing, said wall and the vertically disposed member being provided with registering openings to permit the free passage therethrough of a rearward extension of the tractor transmission shaft.

3. In combination, a tractor unit provided with a vertically disposed rear wall having a central opening therein through which a power take-off shaft may be extended rearwardly, and a unitary frame assembly for supporting a work utility adapted to be driven by said shaft, said assembly including a vertically disposed apertured plate member arranged to be removably secured against said rear wall with the aperture thereof in registry with said opening, and a pair of rearwardly extending members the fore ends of which are rigidly secured to said vertically disposed plate member at opposite sides of the aperture therein.

4. In combination, a tractor unit including a vertically disposed substantially flat member at the rear end thereof, a work utility supporting frame including a vertical plate member adapted for securement flatwise against said vertically disposed rear member of the tractor and a pair of spaced longitudinals extending rearwardly of said vertical plate, said tractor member and said frame member being provided with registering openings through which a power take-off shaft may be projected rearwardly from said tractor for driving said work utility.

5. In combination, a tractor unit including a vertically disposed member extending transversely across the rear thereof, a work utility supporting frame including a vertical plate member arranged for securement flatwise against said tractor member and a pair of spaced longitudinals extending rearwardly of said frame member with the fore ends thereof integrally secured thereto, said tractor and frame members being provided with registering openings through which a power take-off shaft may be projected rearwardly for driving said work utility, and bracing members respectively carried by said longitudinals and diverging therefrom for securement to said tractor member at points spaced vertically from the horizontal plane of said longitudinals.

6. In combination, a tractor unit including a vertically disposed member extending transversely across the rear thereof, said member being centrally apertured in the upper section thereof, a pair of upper bosses projecting rearwardly of said member and arranged to either side of the aperture therein, a laterally spaced lower pair of bosses also projecting rearwardly from said member, a vertically disposed plate member extending transversely across said aperture with the opposite sides thereof secured to said upper bosses, said plate being provided with an aperture for registry with said aforementioned aperture, a pair of spaced longitudinals carried by and extending rearwardly from said plate member, and a pair of inclined brace members respectively interconnecting the free end of each longitudinal with one of said laterally spaced lower bosses, said longitudinals constituting a support for a work utility adapted to be driven by a shaft which is operatively connected to said tractor unit and projects rearwardly through said registering apertures.

7. In combination, a tractor unit including a vertically disposed member extending transversely across the rear thereof, said member being provided with a central opening, a vertically disposed plate member adapted to be disposed flatwise against said rear member of said tractor unit, said plate member being provided with an opening registering with said aforementioned opening, means for securing said members together, a pair of spaced longitudinals integrally secured to and extending rearwardly of said plate member, and a pair of inclined braces respectively interconnecting the free ends of said longitudinals with portions of said tractor member spaced vertically below said plate member, said longitudinals constituting a support for a work utility adapted to be driven by a shaft operatively connected to said tractor unit and projecting rearwardly through said registering openings.

8. An attachment frame for tractor units comprising a substantially vertical disposed plate member having a central opening, a pair of laterally spaced longitudinals the fore ends of which are respectively secured to said plate member to either side of said opening, and a pair of obliquely disposed members respectively secured to said longitudinals at points removed from said vertically disposed member and extending forwardly to points spaced vertically from the horizontal plane of said longitudinals.

9. An attachment frame for tractor units comprising a substantially vertically disposed plate member, said member being provided with a central opening therein, a pair of laterally spaced longitudinals extending rearwardly from the opposed lower corners of said plate member, gusset members respectively secured in the angles formed by said longitudinals and said plate member, and a transversely extending member interconnecting the rear ends of said longitudinals.

In testimony whereof, I have hereunto affixed my signature.

JOSEPH S. OECHSLE.